United States Patent
Sharma

(10) Patent No.: US 10,055,330 B2
(45) Date of Patent: Aug. 21, 2018

(54) FEATURE FILE VALIDATION TOOL

(71) Applicant: Bank of America Corporation, Charlotte, NC (US)

(72) Inventor: Ramesh Sharma, Ontario (CA)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/363,370

(22) Filed: Nov. 29, 2016

(65) Prior Publication Data

US 2018/0150381 A1 May 31, 2018

(51) Int. Cl.
*G06F 9/44* (2018.01)
*G06F 11/36* (2006.01)

(52) U.S. Cl.
CPC ...... *G06F 11/3616* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 5,974,248 A | 10/1999 | Graef | |
| 7,536,599 B2 | 5/2009 | Paliwal et al. | |
| 7,644,368 B2 | 1/2010 | Pins et al. | |
| 8,239,757 B2 | 8/2012 | Johnson et al. | |
| 8,280,919 B2 | 10/2012 | Krishnaswamy et al. | |
| 8,321,839 B2 | 11/2012 | Slone et al. | |
| 8,910,122 B2 | 12/2014 | Baumann et al. | |
| 9,122,497 B2 | 9/2015 | Baumann et al. | |
| 9,361,134 B2 | 6/2016 | Baumann et al. | |
| 2004/0255275 A1* | 12/2004 | Czerwonka | G06F 11/3684 717/124 |
| 2005/0160322 A1* | 7/2005 | West | G06F 11/3684 714/38.1 |
| 2007/0028221 A1* | 2/2007 | Ukelson | G06F 17/30569 717/136 |
| 2007/0220342 A1* | 9/2007 | Vieira | G06F 11/3688 714/33 |
| 2008/0010561 A1* | 1/2008 | Bay | G06F 9/466 714/49 |
| 2008/0276221 A1* | 11/2008 | Lev | G06F 8/74 717/120 |
| 2009/0158251 A1* | 6/2009 | Angrish | G06F 17/30569 717/115 |
| 2009/0204591 A1* | 8/2009 | Kaksonen | G06F 11/3684 |
| 2010/0192220 A1* | 7/2010 | Heizmann | G06F 11/3664 726/19 |

(Continued)

*Primary Examiner* — Insun Kang
(74) *Attorney, Agent, or Firm* — Michael A. Springs

(57) ABSTRACT

A feature file validation tool generates a first test case details file by transforming a test case file to include field names and field values. The feature file includes a plurality of tests, each including a plurality of steps. The feature file validation tool determines whether each of the plurality of steps is valid by comparing each of the plurality of steps to a step definition file. The feature file validation tool applies computer language rules to determine that the first test case details file conforms to the first computer language. The feature file validation tool generates a second test case details file by transforming the first test case details file into a different file format. The feature file validation tool links the two test case detail files using test identifications.

17 Claims, 3 Drawing Sheets

(56) References Cited

U.S. PATENT DOCUMENTS

| | | | |
|---|---|---|---|
| 2011/0145653 A1* | 6/2011 | Broadfoot | G06F 11/3604 714/38.1 |
| 2011/0302552 A1* | 12/2011 | Wada | G06F 11/3684 717/105 |
| 2012/0117095 A1* | 5/2012 | Chawakula | H04L 29/12632 707/758 |
| 2012/0192153 A1* | 7/2012 | Venkatraman | G06F 11/3664 717/124 |
| 2012/0210307 A1* | 8/2012 | Panter | G06F 11/3476 717/140 |
| 2013/0074048 A1* | 3/2013 | Osawa | G06F 8/30 717/127 |
| 2013/0097586 A1* | 4/2013 | Chandra | G06F 11/3684 717/124 |
| 2013/0239092 A1* | 9/2013 | Wieczorek | G06F 11/368 717/126 |
| 2013/0275946 A1* | 10/2013 | Pustovit | G06F 11/3684 717/124 |
| 2013/0311977 A1* | 11/2013 | Nieminen | G06F 11/3672 717/135 |
| 2014/0053134 A1* | 2/2014 | Wiggers | G06F 11/3608 717/124 |
| 2014/0096111 A1* | 4/2014 | Mahler | G06F 11/3676 717/124 |
| 2015/0227452 A1* | 8/2015 | Raghavan | G06F 11/3684 717/124 |
| 2015/0286556 A1* | 10/2015 | Ellis | G06F 11/3684 717/125 |
| 2016/0103678 A1* | 4/2016 | Akbulut | G06F 8/70 717/120 |
| 2016/0132421 A1* | 5/2016 | Cobb, Jr. | G06F 11/3688 717/131 |
| 2016/0283353 A1* | 9/2016 | Owen | G06F 11/3664 |

* cited by examiner

FEATURE FILE VALIDATION TOOL

TECHNICAL FIELD

This disclosure relates generally to software development feature validation and more particularly to a feature file validation tool.

BACKGROUND

Software developers create computer software code. Computer software code has certain functionality. Software developers test the functionality of computer software code in a software code development cycle. Software code may be transformed to different formats in the software development cycle to facilitate software code testing and management.

SUMMARY OF THE DISCLOSURE

According to an embodiment, a feature file validation tool includes a retrieval engine, a configuration engine, a validation engine, and a transformation engine. The retrieval engine receives a request to configure a test case file. The test case file includes a plurality of tests and each test includes a plurality of steps. Each test determines whether a functionality of a software application is operating properly. The retrieval engine retrieves the test case file in response to the request.

The configuration engine receives a plurality of field names. The plurality of field names includes an application field name and a project field name. The configuration engine receives a field value for each of the plurality of field names. The field value for the application field name indicates the software application. The field value for the project field name indicates a software development project. The configuration engine generates a first test case details file in a first computer language. The first test case details file includes the plurality of tests, the plurality of field names, and the field value for each of the plurality of field names.

The validation engine determines whether each of the plurality of steps of the plurality of tests is valid by comparing each of the plurality of steps to a step definition file. The step definition file includes a catalog of predetermined valid steps. The validation engine applies computer language rules to determine that the first test case details file conforms to the first computer language.

The transformation engine generates a second test case details file by transforming the first test case details file from a first file format to a second file format. The second test case details file includes the plurality of tests, the plurality of field names, and the field value for each of the plurality of field names.

According to another embodiment, a method includes receiving a request to configure a test case file, the test case file comprising a plurality of tests and each test comprising a plurality of steps, wherein each test determines whether a functionality of a software application is operating properly. The method further includes retrieving the test case file in response to the request. The method further includes receiving a plurality of field names, the plurality of field names comprising an application field name and a project field name. The method further includes receiving a field value for each of the plurality of field names. The method further includes generating a first test case details file in a first computer language, the first test case details file comprising. The method further includes determining whether each of the plurality of steps of the plurality of tests is valid by comparing each of the plurality of steps to a step definition file, the step definition file comprising a catalog of predetermined valid steps. The method further includes applying computer language rules to determine that the first test case details file conforms to the first computer language. The method further includes generating a second test case details file by transforming the first test case details file from a first file format to a second file format, wherein the second test case details file comprises the plurality of tests, the plurality of field names, and the field value for each of the plurality of field names.

Certain embodiments provide one or more technical advantages. For example, an embodiment reduces or eliminates errors in computer software code by identifying errors in computer software code and/or feature files. As another example, an embodiment reduces processor usage by reducing or eliminating errors in computer software code. As yet another example, an embodiment transforms test file formats to facilitate testing computer software code features and functionality. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
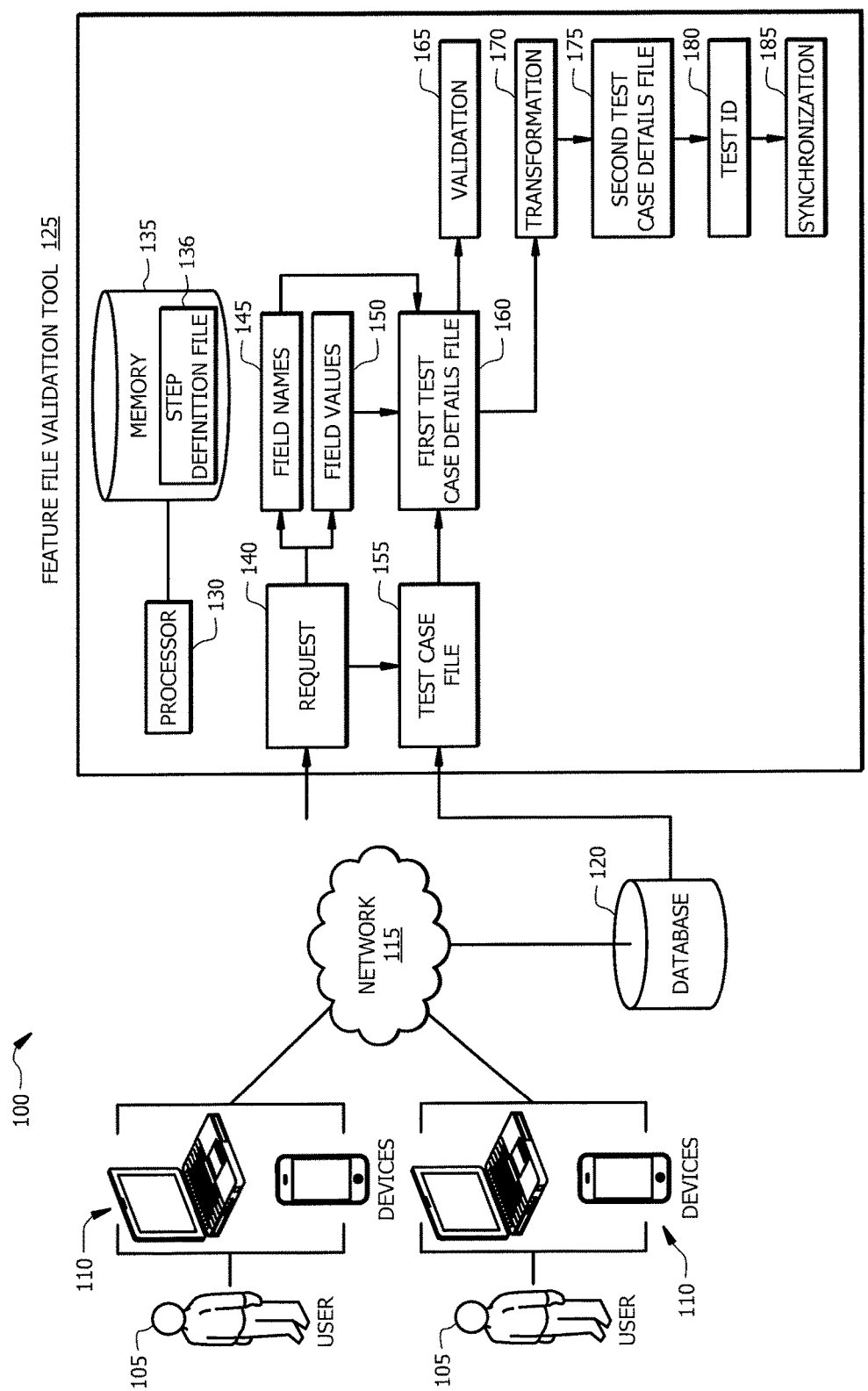
FIG. 1 illustrates a system for software development testing.
Figure 2:
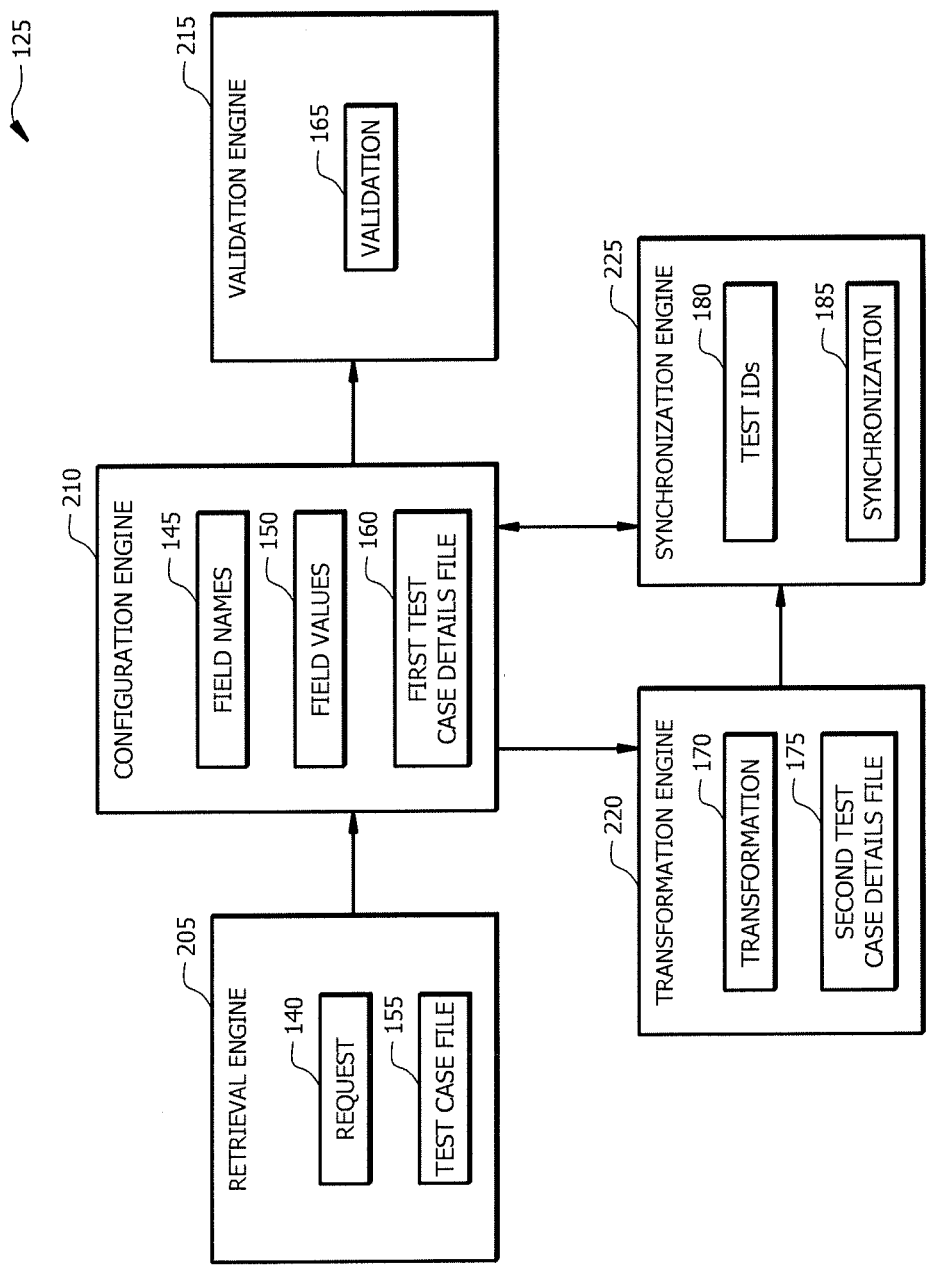
FIG. 2 illustrates the feature file validation tool of the system of FIG. 1.
Figure 3:
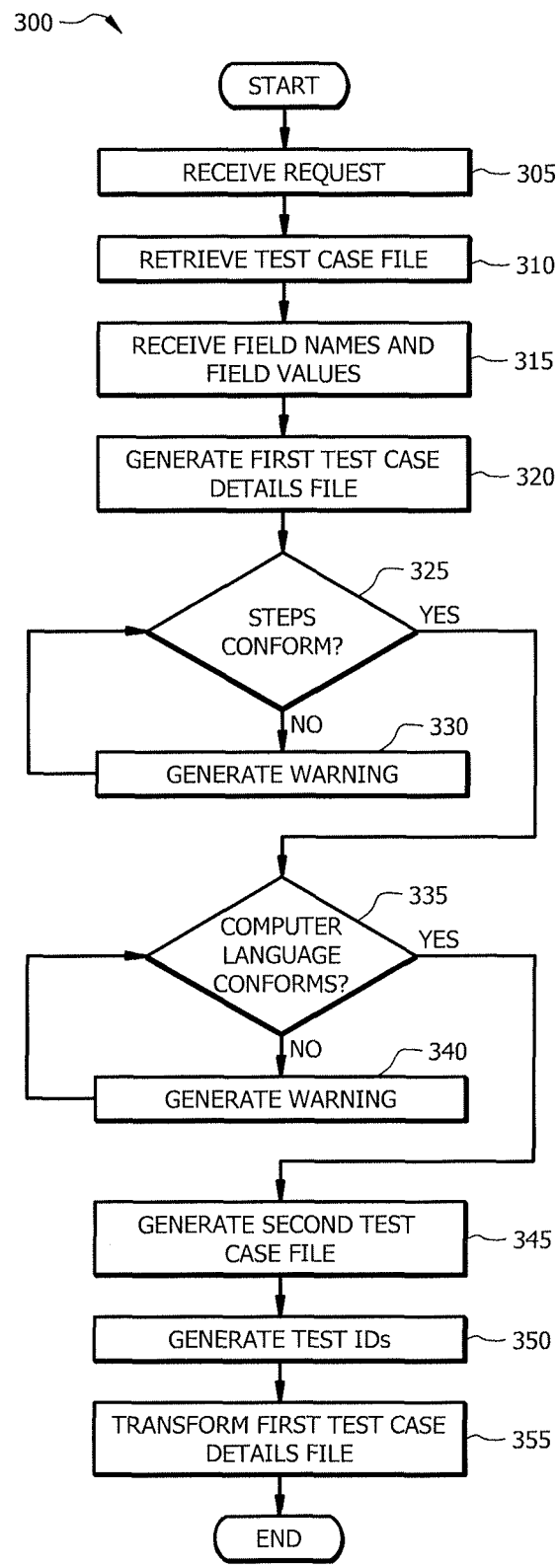
FIG. 3 is a flowchart illustrating a method for software development testing and management using the system of FIG. 1.

Embodiments of the present disclosure and its advantages are best understood by referring to FIGS. 1 through 3 of the drawings, like numerals being used for like and corresponding parts of the various drawings.

Software developers create computer software code. Computer software code has certain functionality. Software developers test the functionality of computer software code in a software code development cycle.

To test the functionality of a software computer program, a software development and testing team may create feature files. Feature files include one or more tests. A test executes a feature of the computer software code to determine whether the computer software code executes as expected. A test may include several steps. For example, a test may determine whether a computer software code for a website landing page is functioning correctly. The steps of the test may include navigating to the landing page, providing a username, providing a password, and navigating to a welcome screen in response to the username and password. The test results indicate whether the computer software code executed as expected.

Feature files may be written in suitable computer language. In some embodiments, a feature file is written using Gherkin language. Feature files may be written in any suitable document format. In some embodiments, a feature file is written in an Extensible Markup Language ("XML") format. Existing tools require execution of a feature file to determine whether the feature file includes errors. For example, a user of an existing tool must execute each step of each test to determine whether the feature file includes an error.

This disclosure contemplates a feature file validation tool that performs design time feature file validation. In some embodiments, the feature file validation tool receives a feature file. The feature file validation tool may determine whether there are errors in feature file's computer language. In some embodiments, the feature file determines whether test steps are valid. Testing feature files in the design stage allows software developers to identify and correct feature file errors before executing feature files, substantially reducing computer processing and memory requirements by eliminating or reducing erroneous execution of feature files with errors.

In some embodiments, the feature file validation tool converts the feature file to a suitable document format. In some embodiments, a feature file is created and/or tested in XML format. In some embodiments, a software tool may manage feature files. For example, the software tool may track errors in the computer software code that is tested using feature files. This disclosure contemplates the feature file validation tool transforming the feature file to a format compatible with the management tool. For example, the feature file validation tool may transform the feature file to an EXCEL format.

The feature file validation tool will be described in more detail using FIGS. 1 through 3. FIG. 1 will describe the feature file validation tool generally. FIGS. 2 and 3 will describe the feature file validation tool in more detail.

FIG. 1 illustrates a system 100 for software development testing. As illustrated in FIG. 1, system 100 may include one more devices 110, a network 115, a database 120, and a feature file validation tool 125. In particular embodiments, system 100 reduces the number of errors in computer software code.

Devices 110 may be any devices that operate and/or communicate with other components of system 100. In general, devices 110 request and receive processed data. For example, devices 110 may communicate a request to validate software code to feature file validation tool 125 or any other suitable component of system 100. In some embodiments, devices 110 may be associated with an enterprise or a business unit within an enterprise.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In some embodiments, system 100 includes database 120. System 100 may include a single database 120 or any number of databases 120. Databases 120 may store software code that is in the software development process cycle. In some embodiments, database 120 stores test case files for testing features of the software code. This disclosure does not limit the databases 120 to storing only software code and test case files. This disclosure contemplates databases 120 storing any suitable data type. For example, databases 120 may store any type of data to be processed.

Feature file validation tool 125 generates test case details files for testing the functionality of software code stored in database 120. As illustrated in FIG. 1, feature file validation tool 125 includes a processor 130 and a memory 135. This disclosure contemplates processor 130 and memory 135 being configured to perform any of the operations of feature file validation tool 125 described herein. In particular embodiments, feature file validation tool 125 reduces the number of errors in computer software code.

Processor 130 is any electronic circuitry, including, but not limited to microprocessors, application specific integrated circuits (ASIC), application specific instruction set processor (ASIP), and/or state machines, that communicatively couples to memory 135 and controls the operation of feature file validation tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of feature file validation tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In some embodiments, memory 135 stores a step definition file 136. Step definition file 136 generally includes a catalog of predetermine valid steps, as discussed in more detail in relation to feature file validation tool 125. This disclosure contemplates memory 135 storing any of the elements stored in databases 120 and/or by feature file validation tool 125.

In an exemplary embodiment, feature file validation tool 125 receives a request 140. In some embodiments, request 140 is a request to configure a test case file 155. As previously discussed, test case file 155 may include one or more tests for determining whether a functionality of a computer software application is functioning properly. In some embodiments, a test includes a plurality of steps, as previously discussed. In some embodiments, test case file 155 is an XML file written in Gherkin language. Test case file 155 may not be compatible with certain software tools. For example, test case file 155 may not include fields required for one or more software tools. Request 140 may be a request to configure test case file 155 to include information required to utilize one or more software tools with test case file 155. In some embodiments, user 105 uses device 110 to generate request 140. User 105 may utilize a graphical user interface to enter information to generate request 140. In some embodiments, the graphical user interface is included in a standalone tool that is system agnostic. In some embodiments, the standalone is designed in a generic way that may be used on a plurality of projects and a plurality of test case files 155.

Feature file validation tool 125 may analyze request 140 to determine a test case file 155, field names 145, and field values 150. In some embodiments, request 140 may include a description of test case file 155. Feature file validation tool 125 may retrieve test case file 155 from database 120. Field name 145 generally facilitates identifying test case file 155 and/or information within test case file 155. For example, field names 145 may include an application field name 145, a project field name 145, a type field name 145, and/or test field name 145. In some embodiments, each field name 145 corresponds to a field value 150. Field value 150 generally provides information for test case file 155. For example, field value 150 may include the name of the application that test case file 155 is testing (corresponding to application field name 145), a project field value 150 (corresponding to project name field 145), and any other suitable field value 150 that corresponds to a field name 145. In some embodiments, test case file 155 may not include field names 145 and/or field values 150. In some embodiments, test case file 155 must include field names 145 and/or field value 150 to be compatible with certain software tools.

In some embodiments, feature file validation tool 125 generates first test case details file 160 using test case file 155, field names 145, and field values 150. For example, feature file validation tool 125 may transform test case file 155 to include field names 145 and their corresponding field values 150. Field names 145 and field values 150 may apply to test case file 155 as a whole, to one or more tests within test case file 155, and/or to one or more steps of the one or more tests within test case file 155.

In some embodiments, feature file validation tool 125 performs validation 165 on first test case details file 160. Validation 165 may determine whether first test case details file 160 includes computer language errors. In some embodiments, first test case details file 160 includes Gherkin language. Gherkin computer language, as with any computer language, requires that code be written in a particular format. Feature file validation tool 125 may determine that first test case details file 160 complies with Gherkin language formatting. For example, feature file validation tool 125 may apply computer language rules to first test case details file 160. Computer language rules may be rules that include requirements of the computer language. As another example, feature file validation tool 125 may determine whether first test case details file 160 includes errors such as typos. This disclosure contemplates first test case details file 160 written in any suitable computer language and feature file validation tool 125 determining whether first test case details file 160 conforms to requirements for the computer language.

Feature file validation tool 125 may validate steps in first test case details file 160. As previously discussed, first test case details file 160 may include a plurality of tests to determine whether a software application is functioning properly given certain inputs and/or commands. Each test may include a plurality of steps. For example, a test may determine whether a calculator functionality for a software application is functioning properly. A step may include a command to launch the calculator functionality of the software application. Another step may provide inputs to the calculator software application. For example, the inputs may be 1 and 2. A step may include a command to multiply the inputs. A test may include an expected output. In this example, the expected output may be 2. In some embodiments, a test facilitates determining whether a software application is functioning properly by comparing an output of the software application to an expected output. In some embodiments, a software tool may accept only predefined steps. These predefined steps may be stored in step definition file 136. Step definition file 136 includes a catalog of predetermined valid steps, in some embodiments. Feature file validation tool 125 may compare steps in first test case details file 160 to predetermined steps to perform validation 165.

Feature file validation tool 125 completes transformation 170 to transform first test case details file 160 to second test case details file 175, in some embodiments. As discussed, a software development and testing team may utilize a plurality of software tools to facilitate testing software application features in a design phase of a software application. For example, a software development and testing team may use a first software tool to generate and execute test case files. As another example, a software development and testing team may utilize a second software tool to manage the development lifecycle process. In this example, the second software tool may store a summary of errors identified by executing test case files. As another example, the second software tool may store information for development progress and/or any other software application development cycle management information. Two of more of the software tools may require test case files 155 to be in a different format. First test case details file 160 may be compatible with a first software tool. For example, first test case details file 160 may be in an XML format. Second test case details file 175 may be compatible with a second software tool. For example, second test case details file 175 may be in an EXCEL format.

In some embodiments, feature file validation tool 125 generates test identification ("IDs") 180 for the second test case details file 175. In some embodiments, a test ID 180 may identify a test in second test case details file 175. In some embodiments, test ID 180 may identify a step of a test in second test case details 175. Test IDs 180 may include an alphabetical indicator, a numerical indicator, a special character indicator, and/or any other suitable type of indicator. Feature file validation tool 125 may revise second test case details file 175 to include test IDs 180. A software development and test team may utilize test IDs 180 to uniquely identify a test and/or a step within, e.g., second test case details file 175. As discussed in more detail below, test IDs 180 may facilitate linking first test case details file 160 and second test case details file 175.

In some embodiments, feature file validation tool 125 completes synchronization 185 using first test case details file 160 and test IDs 180. A test case ID 180 is a unique identifier for a test and/or a step. As discussed, first test case details file 160 and second test case details file 175 may include the same or substantially the same tests and steps. Thus, if a test and/or a step in second test case details file 175 receives a test ID 180, feature file validation tool 125 revises first test case details file 160 so that the corresponding test and/or step in first test case details file 160 receives the same or substantially the same test ID 180. This allows tests and/or steps in first test case details file 160 and second test case details file 175 to be linked. This facilitates the software development cycle by allowing information for a test and/or step to be updated between test case details file.

Modifications, additions, or omissions may be made to system 100 without departing from the scope of the invention. For example, system 100 may include any number of processors 130, memory 135, devices 110, and/or databases 120. While discussed as generating first test case details file 160 and second test case details file 175, this disclosure contemplates generating any suitable number of test case details files. Furthermore, the components of system 100 may be integrated or separated. For example, in particular implementations, memory 135 may be separated into multiple memories 135 to store the data descried herein.

FIG. 2 illustrates the feature file validation tool 125 of the system 100 of FIG. 1. As illustrated in FIG. 2, feature file validation tool 125 includes a retrieval engine 205, a configuration engine 210, a validation engine 215, a transformation engine 220, and a synchronization engine 225. In particular embodiments, feature file validation tool 125 reduces errors in computer software by facilitating software application feature testing.

Retrieval engine 205 receives request 140 and test case file 155, in some embodiments. In particular embodiments, retrieval engine 205 receives request 140 from one or more devices 110. For example, user 105 may generate request 140 using a graphical user interface of device 110. In some embodiments, request 140 is a request to configure test case file 155. As previously, discussed, test case file 155 may include a plurality of tests and each test may include a plurality of steps. In some embodiments, each test determines whether a functionality of a software application is operating properly. In some embodiments, retrieval engine 205 receives test case file 155 from database 120. An example algorithm for retrieval engine 200 is as follows: wait for request 140; receive request 140 from one or more devices 110; in response to receiving request 140, retrieve test case file 155 from database 120; receive test case file 155; and communicate request 140 and test case file 155 to configuration engine 210.

Configuration engine 210 determines field names 145 and field values 150 and generates first test case details file 160 using test case file 155, field names 145, and field values 150, in some embodiments. Configuration engine 210 may extract field names 145 and field values 150 from request 140 in some embodiments. In some embodiments field names 150 include an application field name 145 and a project field name 150. In this example, field values 150 may include a field value 150 for the application field name that indicates the software application being tested. Field values 150 may include a field value 150 for the project field name that indicates a software development project. User 105 may enter field names 145 and field values 150 using a graphical user interface of device 110. Configuration engine 210 may use field names 145 and field values 150 to generate first test case details file 160. In some embodiments, configuration engine 210 revises test case file 155 to include field names 145 and field values 150 to generate test case details file 160. Configuration engine 210 may communicate first test case details file 160 to validation engine 215, transformation engine 220, and/or synchronization engine 225. An example algorithm for configuration engine 210 generating first test case details file 160 is as follows: receive request 140 and test case file 155; analyze request 140 to determine field name 145 and field values 150; generate first test case details file 160 using test case file 155, field names 145, and field values 150; and communicate first test case details file 160 to validation engine 215.

Validation engine 215 performs validation 165, in some embodiments. As previously discussed, validation 165 may include a two-part validation. For example, validation 165 may determine whether the computer language of test case file 155 conforms to the rules associated with the computer language. In this example, feature validation engine 215 may apply computer language rules to all or a part of first test case details file 160 to determine whether it conforms to the computer language. Computer language rules may include rules for the computer language requirements. As another example, validation engine 215 determines whether each step in the first test case details file 160 is valid by comparing the steps to one or more steps in step definition file 136. Step definition file 136 may include a catalog of predetermine valid steps. Validation engine 215 may retrieve step definition file 136 from database 120, memory 135, and/or any other suitable component of system 100. In some embodiments, database 120 communicates step definition file 136 to feature file validation tool 125 where it is stored in memory 135. In some embodiments, user 105 generates step definition file 136. If validation engine 215 determines that first test case details file 160 does not conform to computer language rules and/or that a step is not valid, validation engine 215 may generate a warning to user 105, in some embodiments. An example algorithm for validation engine 215 to perform validation 165 is as follows: receive first test case details file 160 from configuration engine 210; determine whether computer language in first test case details file 160 conforms to rules for the computer language; and determine whether each step in first test case details file 160 is valid.

Transformation engine 220 performs transformation 170 to generate second test case details file 175 in some embodiments. Transformation engine 220 may transform first test case details file 160 from a first file format to a second file format to perform transformation 170. In some embodiments, second test case details file 175 includes the plurality of tests, the plurality of field names 145, and the plurality of field values 150 from first test case details file 160. In some embodiments, first test case details file 160 is an XML file format and transformation engine 220 performs transformation 170 to generate second test case details file 175 in an EXCEL file format. An example algorithm for transformation engine 220 to perform transformation 170 to generate second test case details file 175 is as follows: receive first test case details file 160; perform transformation 170 to generate first test case details file 160 to second test case details file 175; communicate second test case details file 175 to synchronization engine 225.

Synchronization engine 225 generates test IDs 180 for each of the one or more of the tests and/or steps in second test case details file 175 and performs synchronization 185, in some embodiments. As previously discussed, test IDs 180 are unique identifiers for a test and/or step in second test case details file 175. Synchronization engine 225 may perform synchronization 185 in some embodiments. For example, synchronization engine 225 may revise first test case details file 160 to include test IDs 180. In some embodiments, first test case details file 160 and/or second test case details file 175 include the same or substantially the same tests and/or steps. If a test and/or a step in second test case details file 175 is linked to a test ID 180, synchronization engine 225 revises first test case details file 160 such that the corresponding test and/or step in first test case details file 160 is linked to the same test ID 180, in some embodiments. An example algorithm for synchronization engine 225 is as follows: receive second test case details file 175; generate test IDs 180 for tests and/or steps in second test case details file 175; perform synchronization 185 to revise first test case details file 160 to include test IDs 180.

Modifications, additions, or omissions may be made to feature file validation tool 125 without departing from the scope of the invention. For example, while discussed as retrieval engine 205 receiving a single test case file 155, retrieval engine 205 may receive any number of test case files 155. Feature file validation tool 125 may generate a single first test case details file 160 from a plurality of test case files 155. As another example, feature file validation tool 125 may generate a first test case details file 160 for each received test case file 155. In some embodiments, user 105 may instruct feature file validation tool 125 to determine a single first test case details file 160 from a plurality of test case files 155 using a graphical user interface of device 110. As another example, validation engine 215 may perform validation 165 on test case file 155, first test case details file 160, and/or second test case details file 175.

FIG. 3 is a flowchart illustrating an example method 300 for software development testing and management using the system of FIG. 1. In particular embodiments, feature file validation tool 125 performs method 300. By performing method 300, feature file validation tool 125 reduces the number of errors in computer software application development.

In some embodiments, feature file validation tool 125 begins by receiving request 140 to configure test case file 155 in step 305. In step 310, feature file validation tool 125 may retrieve test case file 155 in response to request 140. Feature file validation tool 125 receives field names 145 and field values 150 in step 315, in some embodiments. For example, feature file validation tool 125 may extract field names 145 and/or field values 150 from request 140. Feature file validation tool 125 generates first test case details file 160 using test case file 155, field names 145, and field values 150 in step 320, in some embodiments.

Feature file validation tool 125 may determine whether the steps in first test case details file 160 conform with step rules in step 325. For example, feature file validation tool 125 may compare each step in first test case details file 160 to a catalog of predetermined valid steps. If the steps do not conform to predetermined valid steps in step 325, feature file validation tool 125 may generate a warning in step 330 before returning to step 325. If the steps do conform to predetermined valid steps in step 325, the method proceeds to step 335 where feature file validation tool 125 determines whether the computer language in first test case details file 160 conforms to a computer language by applying computer language rules. If the computer language does not conform, the method proceeds to step 340 where feature file validation tool 125 generates a warning before proceeding to step 335, in some embodiments.

If the computer language does conform, the method proceeds to step 345 where feature file validation tool 125 generates second test case details file 175, in some embodiments. Feature file validation tool 125 may generate test IDs 180 at step 350 and perform synchronization 185 at step 355. For example, feature file validation tool 125 may transform first test case details file 160 to include test IDs 180 as previously discussed.

Modifications, additions, or omissions may be made to method 300 depicted in FIG. 3. Method 300 may include more, fewer, or other steps. For example, steps may be performed in parallel or in any suitable order. While discussed as feature file validation tool 125 performing the steps, any suitable component of system 100, such as device(s) 110 for example, may perform one or more steps of the method.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A feature file validation tool stored on a hardware memory comprising:
a retrieval engine configured to:
receive a request to configure a test case file, the test case file comprising a plurality of tests and each test comprising a plurality of steps, wherein each test determines whether a functionality of a software application is operating properly; and
retrieve the test case file in response to the request;
a configuration engine configured to:
receive a plurality of field names, the plurality of field names comprising an application field name and a project field name;
receive a field value for each of the plurality of field names, wherein:
the field value for the application field name indicates the software application; and
the field value for the project field name indicates a software development project; and
generate a first test case details file in a first computer language by including the received field names and the received field value for each of the plurality of field names in the test case file, the first test case details file comprising:
the plurality of tests;
the plurality of field names; and
the field value for each of the plurality of field names;
a validation engine configured to:
determine whether each of the plurality of steps of the plurality of tests is valid by comparing each of the plurality of steps to a step definition file, the step definition file comprising a catalog of predetermined valid steps; and
apply computer language rules to determine that the first test case details file conforms to the first computer language;
a transformation engine configured to generate a second test case details file by transforming the first test case details file from a first file format to a second file format, wherein the second test case details file comprises the plurality of tests, the plurality of field names, and the field value for each of the plurality of field names; and
a synchronization engine configured to:
generate a test identifier for each of the plurality of steps in the second test case details file; and
transform the first test case details file to include the test identifier for each of the plurality of steps.

2. The feature file validation tool of claim 1, wherein the first file format is an Extensible Markup Language format and the second file format is an EXCEL format.

3. The feature file validation tool of claim 1, wherein the first computer language is a Gherkin computer language.

4. The feature file validation tool of claim 1, wherein the validation engine generates a warning message upon at least one of a determination that one or more of the plurality of steps of the plurality of tests is not valid and a determination that the first test case details file does not conform to the first computer language.

5. The feature file validation tool of claim 1, wherein:
the retrieval engine is further configured to retrieve a plurality of test case files;
the generation engine is further configured to generate a test case details file for each of the plurality of test case files; and
the second test case details file comprises each of the plurality of test case files.

6. The feature file validation tool of claim 1, wherein the configuration engine receives the plurality of field names and the field value for each of the plurality of field names from a graphical user interface.

7. A method comprising:
receiving a request to configure a test case file, the test case file comprising a plurality of tests and each test comprising a plurality of steps, wherein each test determines whether a functionality of a software application is operating properly;
retrieving the test case file in response to the request;
receiving a plurality of field names, the plurality of field names comprising an application field name and a project field name;
receiving a field value for each of the plurality of field names, wherein;
the field value for the application field name indicates the software application; and
the field value for the project field name indicates a software development project;
generating a first test case details file in a first computer language by including the received field names and the received field value for each of the plurality of field names in the test case file, the first test case details file comprising:
the plurality of tests;
the plurality of field names; and
the field value for each of the plurality of field names;
determining whether each of the plurality of steps of the plurality of tests is valid by comparing each of the plurality of steps to a step definition file, the step definition file comprising a catalog of predetermined valid steps;
applying computer language rules to determine that the first test case details file conforms to the first computer language;
generating a second test case details file by transforming the first test case details file from a first file format to a second file format, wherein the second test case details file comprises the plurality of tests, the plurality of field names, and the field value for each of the plurality of field names;
generating a test identifier for each of the plurality of steps in the second test case details file; and
transforming the first test case details file to include the test identifier for each of the plurality of steps.

8. The method claim 7, wherein the first file format is an Extensible Markup Language format and the second file format is an EXCEL format.

9. The method claim 7, wherein the first computer language is a Gherkin computer language.

10. The method claim 7, further comprising generating a warning message upon at least one of a determination that one or more of the plurality of steps of the plurality of tests is not valid and a determination that the first test case details file does not conform to the first computer language.

11. The method claim 7, further comprising:
retrieving a plurality of test case files;
generating a test case details file for each of the plurality of test case files; and
the second test case details file comprises each of the plurality of test case files.

12. The method claim 7, further comprising receiving the plurality of field names and the field value for each of the plurality of field names from a graphical user interface.

13. A non-transitory computer-readable medium comprising software, the software when executed by one or more processing units configured to:
receive a request to configure a test case file, the test case file comprising a plurality of tests and each test comprising a plurality of steps, wherein each test determines whether a functionality of a software application is operating properly;
retrieve the test case file in response to the request;
receive a plurality of field names, the plurality of field names comprising an application field name and a project field name;
receive a field value for each of the plurality of field names, wherein:
the field value for the application field name indicates the software application; and
the field value for the project field name indicates a software development project;
generate a first test case details file in a first computer language by including the received field names and the received field value for each of the plurality of field names in the test case file, the first test case details file comprising:
the plurality of tests;
the plurality of field names; and
the field value for each of the plurality of field names;
determine whether each of the plurality of steps of the plurality of tests is valid by comparing each of the plurality of steps to a step definition file, the step definition file comprising a catalog of predetermined valid steps;
apply computer language rules to determine that the first test case details file conforms to the first computer language;
generate a second test case details file by transforming the first test case details file from a first file format to a second file format, wherein the second test case details file comprises the plurality of tests, the plurality of field names, and the field value for each of the plurality of field names;
generate a test identifier for each of the plurality of steps in the second test case details file; and
transform the first test case details file to include the test identifier for each of the plurality of steps.

14. The medium of claim 13, wherein the first computer language is a Gherkin computer language.

15. The medium of claim 13, the software when executed by one or more processing units further configured to generate a warning message upon at least one of a determination that one or more of the plurality of steps of the plurality of tests is not valid and a determination that the first test case details file does not conform to the first computer language.

16. The medium of claim 13, the software when executed by one or more processing units further configured to:
retrieve a plurality of test case files;
generate a test case details file for each of the plurality of test case files; and
the second test case details file comprises each of the plurality of test case files.

17. The medium of claim 13, the software when executed by one or more processing units further configured to receive the plurality of field names and the field value for each of the plurality of field names from a graphical user interface.

* * * * *